US012219927B2

(12) United States Patent
Haber et al.

(10) Patent No.: US 12,219,927 B2
(45) Date of Patent: Feb. 11, 2025

(54) RODENT EXERCISE APPARATUS

(71) Applicant: Rolling Rodents, LLC, Winston-Salem, NC (US)

(72) Inventors: Adam Haber, Roslyn, NJ (US); Ethan Haber, Winston-Salem, NC (US); William Fiebel, Succasunna, NJ (US); Mark Dorsey, Darien, CT (US); Joohwi Rhi, Oradell, NJ (US); Mathieu Zastawny, Jersey City, NJ (US); Maya Kremien, Austin, TX (US)

(73) Assignee: ROLLING RODENTS, LLC, Roslyn, NY (US)

( * ) Notice: Subject to any disclaimer, the term of this patent is extended or adjusted under 35 U.S.C. 154(b) by 0 days.

(21) Appl. No.: 17/172,628

(22) Filed: Feb. 10, 2021

(65) Prior Publication Data

US 2021/0282372 A1 Sep. 16, 2021

Related U.S. Application Data

(60) Provisional application No. 62/972,578, filed on Feb. 10, 2020.

(51) Int. Cl.
*A01K 15/02* (2006.01)

(52) U.S. Cl.
CPC .................. *A01K 15/025* (2013.01)

(58) Field of Classification Search
CPC .... A01K 15/025; A01K 15/02; A01K 15/027; A01K 29/00; A01K 1/03; A61H 2015/0042; A63B 43/00; B65F 1/1615; Y10T 70/5761; B65D 43/02; B65D 43/022; B65D 43/0231; B65D 43/021; B65D 43/0225; B65D 51/1683; B65D 55/02; B65D 25/32; B65D 21/0222; B65D 43/267; E05C 3/24; E05C 19/022; E05C 1/08; E05C 3/16; E05C 1/04; E05C 1/06; A01D 30/16
USPC .................................................. 119/702, 707
See application file for complete search history.

(56) References Cited

U.S. PATENT DOCUMENTS

| 2,681,638 | A | * | 6/1954 | Carvell | A01K 15/027 |
| | | | | | 119/700 |
| 3,785,347 | A | * | 1/1974 | Dinnerstein | A01K 1/035 |
| | | | | | 119/700 |
| 5,116,255 | A | * | 5/1992 | Keeling | A01K 1/0356 |
| | | | | | 119/702 |
| 5,280,906 | A | * | 1/1994 | Vitale | A63B 43/00 |
| | | | | | 273/DIG. 20 |
| 2013/0098124 | A1 | * | 4/2013 | Williams | E05B 7/00 |
| | | | | | 292/210 |
| 2015/0237830 | A1 | * | 8/2015 | Sternal | A01K 15/027 |
| | | | | | 119/702 |

* cited by examiner

*Primary Examiner* — Jeffrey R Larsen
(74) *Attorney, Agent, or Firm* — Carter, DeLuca & Farrell LLP

(57) ABSTRACT

The current disclosure is directed to an improvement on the exercise ball for rodents and other small animals that are kept as pets. The invention is a spherical enclosure that allows the pet to experience freedom of movement in a safe environment. This polymer plastic sphere allows small rodents to exercise while maintaining rodent health and providing improved ergonomics for the user. The ball consists of multiple parts: a bottom hemisphere, a top hemisphere and a door.

21 Claims, 5 Drawing Sheets

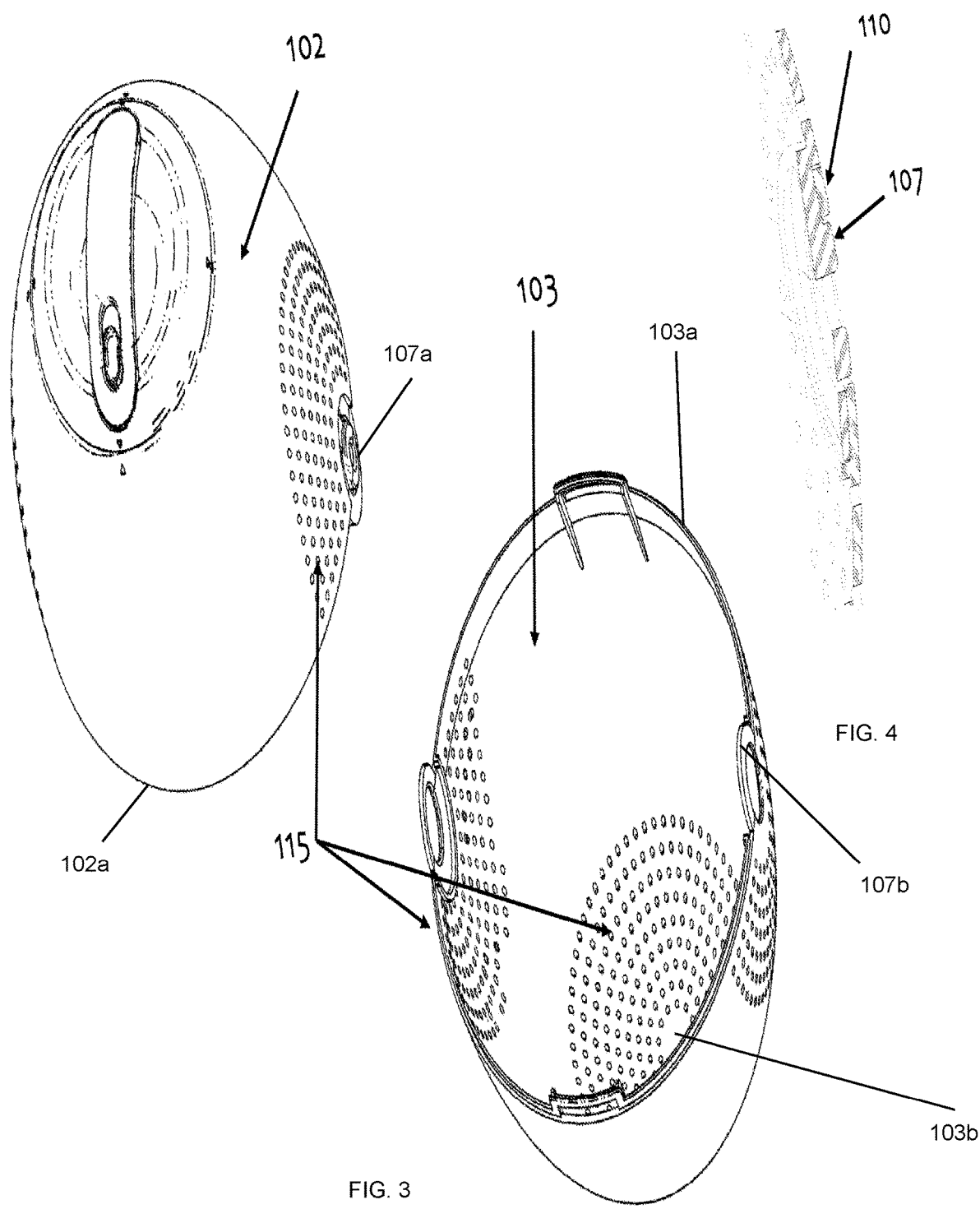

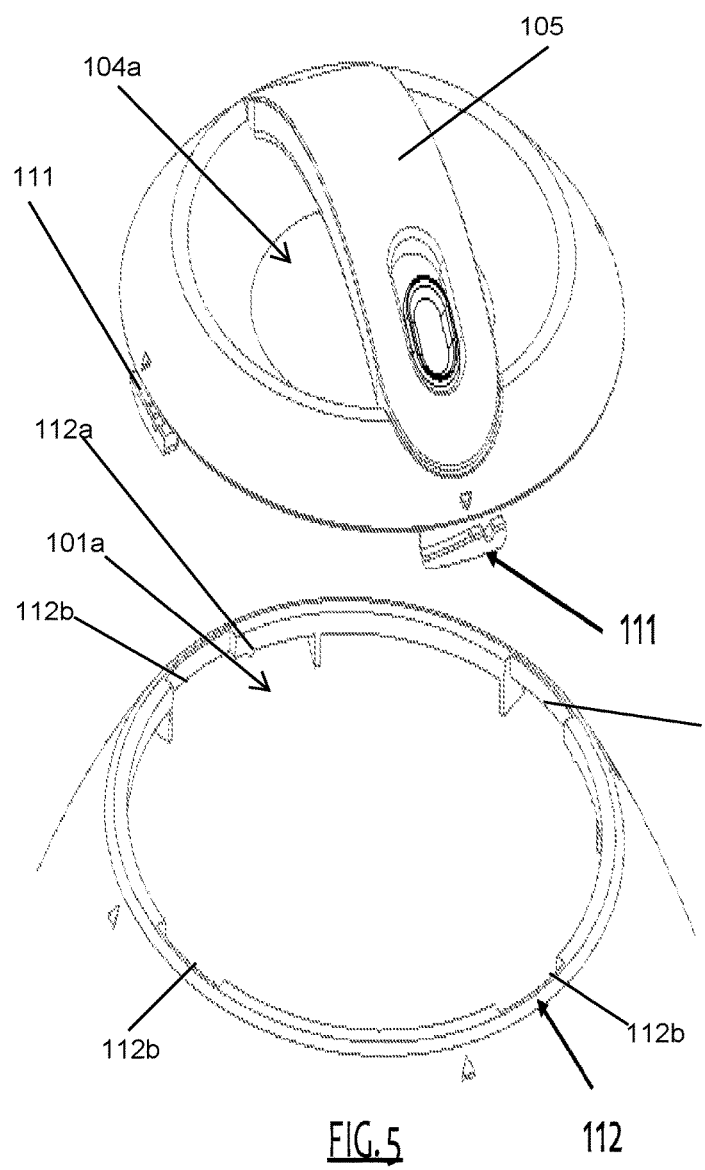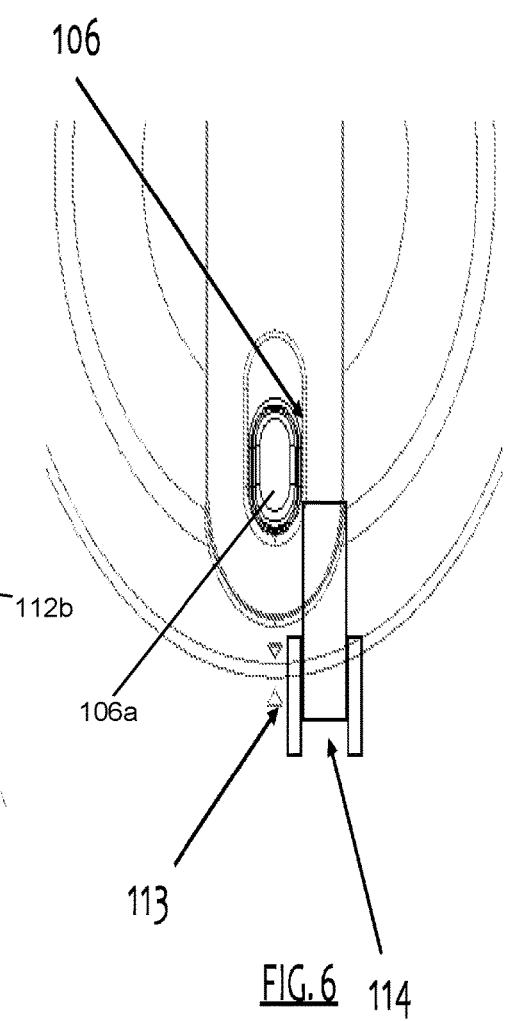
FIG.5
FIG.6

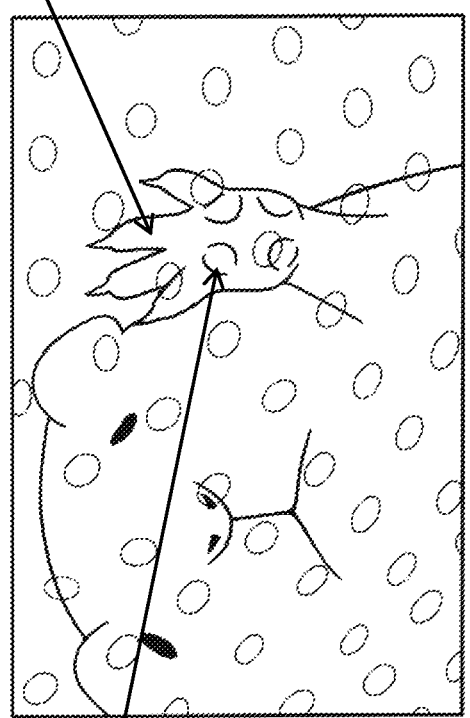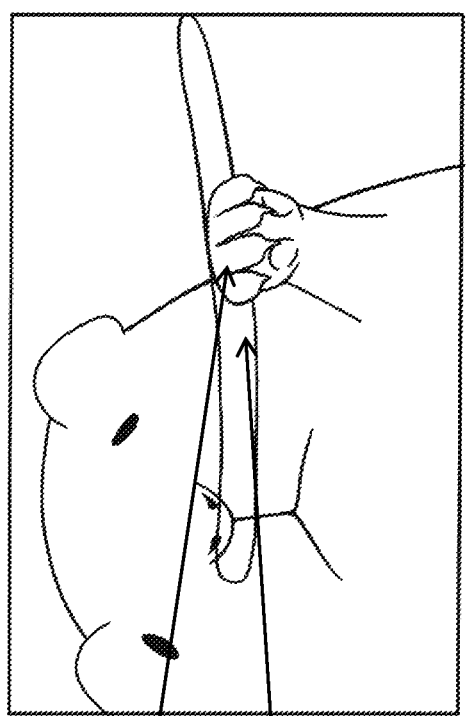

RODENT EXERCISE APPARATUS

CROSS-REFERENCE TO RELATED APPLICATIONS

Provisional application No. 62/972,578, filed on Feb. 10, 2020

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING

Not Applicable

BACKGROUND

The current disclosure is directed to an improvement on the exercise ball for rodents and other small animals that are kept as pets. When comes to exercise device systems for hamsters and other small rodents, there are several options available that provide for ventilation, ease of assembly/disassembly, removal of waste, and pet safety while designed to be more manageable on the go. Applicant believes that improvements can be made in terms of at least one of the types of novelty methods produced and the efficiencies gained for a carrier for a hamster ball. It is to at least one of these, or additional problems that the current disclosure is directed.

SUMMARY

By way of summary, the current disclosure is directed to an improvement on the exercise ball for rodents and other small animals that are kept as pets. The invention is a spherical enclosure that allows the pet to experience freedom of movement in a safe environment. This polymer plastic sphere allows small rodents to exercise while maintaining rodent health and providing improved ergonomics for the user. The ball consists of multiple parts: a bottom hemisphere, a top hemisphere and a door. It is novel in comparison to other exercise balls for the following reasons:

The current disclosure is safer and healthier for the pet. The exercise ball is healthier for pet because of the unique perforated ventilation pattern, which consists of small circular apertures with beveled corners, small enough to prevent pet injury. Other exercise balls have long and thin rectangular vents. It is known that the feet and claws of pets are reported to get injured because they become caught in these elongated rectangular vents. The vent pattern of the present invention reduces the risk of pet injury because the apertures are small and circular with beveled edges.

The present invention discloses a closing mechanism of the door resulting in a structure that is more secure and eliminates the likelihood decoupling and of escape for the pet. The door for this ball is substantially more secure relative to other exercise balls. It is known that small pets are reported to escape often from existing competitor products. The door mechanism is superior for the following reasons:

a. The locking mechanism consists of a quarter turn twisting mechanism which is superior to similar products because it creates a smoother motion and a tighter seal.
b. The door includes a visual alignment cue which allows user to understand when the door is locked and when it is not completely locked. Existing balls give a false tactile cue that has been known to confuse users, allowing them think the cap is secure even though it is still loose.

The current disclosure is easier to clean than similar competitor products. The unique snap detail at the middle of ball allows disassembly into two halves making cleaning easier.

Applicant believes that improvements have been made in terms of at least one of the types of novelty methods produced and the efficiencies gained for the hamster ball. It is to at least one of these, or additional problems that the current disclosure is directed.

Other examples will be set forth in more detail in the figures and detailed description below. The current disclosure is also directed to methods of adaptation and use. It will be apparent; however, that the detailed description is not intended to limit the present invention.

BRIEF DESCRIPTION OF THE SEVERAL VIEWS OF THE DRAWING

The accompanying drawings form part of this specification and the invention will be better understood by a reading of the Detailed Description of the Examples of the Invention along with a review of said drawings wherein:

FIG. 3 illustrates the two hemispheres of the disassembled exercise ball.

FIG. 4 illustrates the unique snap features along the equator of the ball, allowing the user to easily disassemble and clean the ball.

FIG. 5 illustrates the handle piece, the door piece, and the quarter turn twisting mechanism FIG. 6 illustrates the ¼ inch turn locking mechanism and safety latch of the door piece

FIG. 9: Illustrates how the pet rodent's paws are protected from injury with the apertures as disclosed in the present invention.

FIG. 10: Illustrates how the pet rodent's paws are exposed to injury in the hamster ball that utilizes the aperture elongated slats.

DETAILED DESCRIPTION OF THE EXAMPLES OF THE INVENTION

Figure 1:
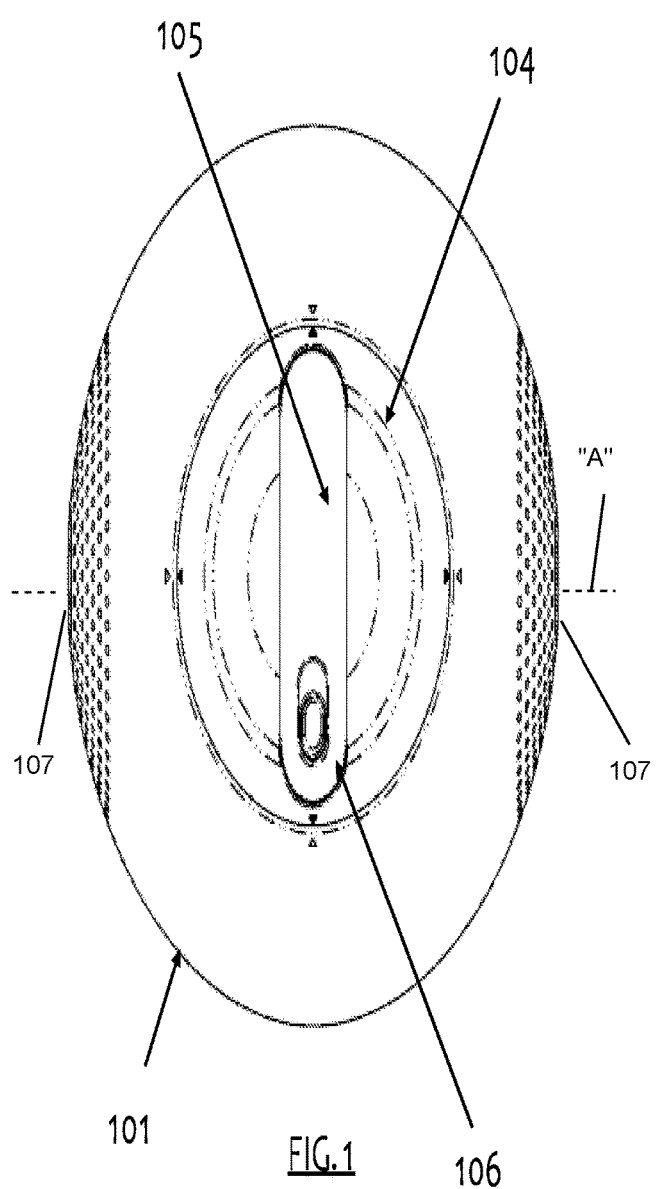
FIG. 1 illustrates the top of the exercise ball with the unique architecture of the door which seats securely on the ball, mitigating the risk of the door opening when in use by pet, as well as the unique and iconic handle.
Figure 2:
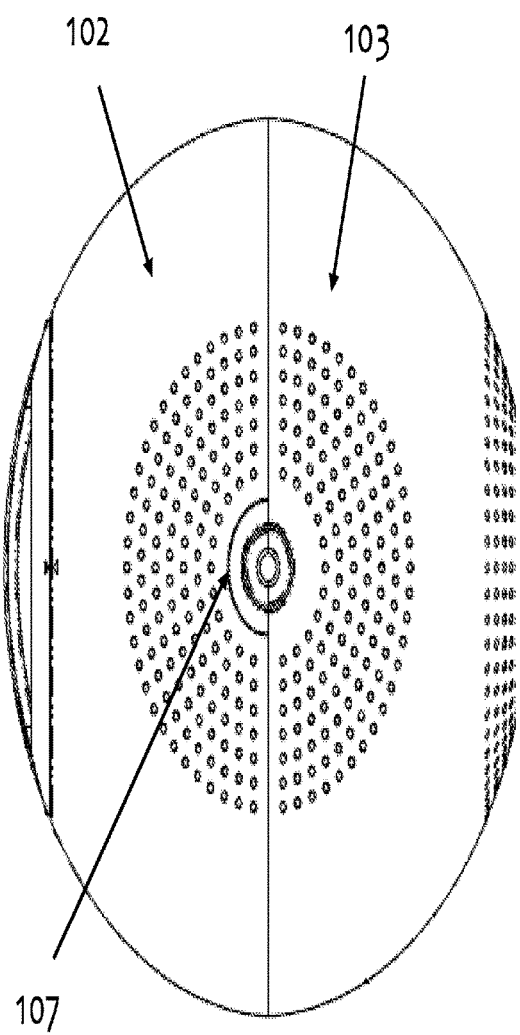
FIG. 2 illustrates the exercise ball as well as the unique and iconic ventilation pattern.

FIGS. 1-6 illustrate the rodent exercise apparatus or exercise ball 101 designed to provide hamsters, rodents and other small pets a vehicle for safe exercise. The exercise ball sizes are about 5 inches to about 13 inches in diameter. The ball includes two halves or first and second hemispheres 102, 103 of a hollowed sphere that define a spherical cavity 101a of a ball housing 112 between the hemispheres 102, 103. The two half spheres can be disassembled for ease of cleaning. The parts of the sphere may be made from any number of polymer plastics. FIG. 1 illustrates the top portion of the ball which includes a door 104 for the rodent to enter and exit the ball housing 112. The door is fitted with a handle 105 to assist with installing and removing the door from the ball housing 112. The polymer plastic contains circular, beveled annular apertures 115 that are about 1 millimeter to about 4 millimeters in diameter. The apertures create ample ventilation, as well as provide grip for pet's feet and claws. The vent pattern is located in circular patterns (e.g., concentric circles) around coupling assemblies 107 (e.g., latch buttons of a coupling mechanism and around a closed end 103b of sphere 103 opposite the handle 105 of sphere 102. These vent patterns are specifically designed to prevent feet and claws of rodents from getting caught and breaking. This is a common pain point in competitor products, that all have elongated rectangular vents. Each coupling assembly includes a first or male coupler 107a (e.g., on the first hemisphere 102) and a second or female coupler 107b (e.g., on the second hemisphere 103) that are selectively engageable via snap-fit and may be separated, for instance, to enable cleaning of the inside of ball 101. As seen in FIG. 1, ball 101 defines a central axis "A" that extends through the coupling assemblies 107

FIG. 3 illustrates the detached hemispheres of the exercise ball and delineates annular engagement ends 102a and 103a of respective hemispheres 102, 103. The perforated ventilation can be seen encircling the latch buttons 107 on either side of the exercise ball and at the bottom of the sphere. The pattern, which consists of small circular apertures with beveled corners, specifically designed to be small enough to prevent pet injury.

FIG. 4 illustrates a cross section of ball housing. A latch button on either side of ball housing 107 can be depressed to release ball housing and separate the two sections of the sphere 108.

FIG. 5 illustrates the door 104 that is attached by door locking features such as snap features 111, that couple to shell locking feature 112a (e.g., detent) depending into spherical cavity 101a from the ball housing 112. Door 104 further defines an external recess or finger cavity 104a over which handle 105 extends to enable a user to wrap their fingers underneath the handle 105. Coupled to the handle 105 and the door 104 is a safety latch mechanism 106 to ensure the safety of the rodent from being accidentally let loose. The ergonomic door operates by a quarter turn twisting mechanism to allow inserting and removing hamster from ball. The door contains four snap features 111 located 90 degree apart on the lower edge of the door. The exercise ball contains corresponding landings 112b for receiving the snap features. Once the door is placed on the landings, the door is sealed through a quarter turn twisting mechanism.

FIG. 6 illustrates a safety latch mechanism 106 that operates by sliding an actuator or Switch 106a which incorporates a tab 114 in between two stop features 113 on the ball housing 112. The tab prevents the rotational forces from normal use of the exercise ball causing the door to decouple from the exercise ball. Insofar as the description above and the accompanying drawings disclose any additional subject matter that is not within the scope of the claims below, the inventions are not dedicated to the public and the right to file one or more applications to claim such additional inventions is reserved.

Figure 7:
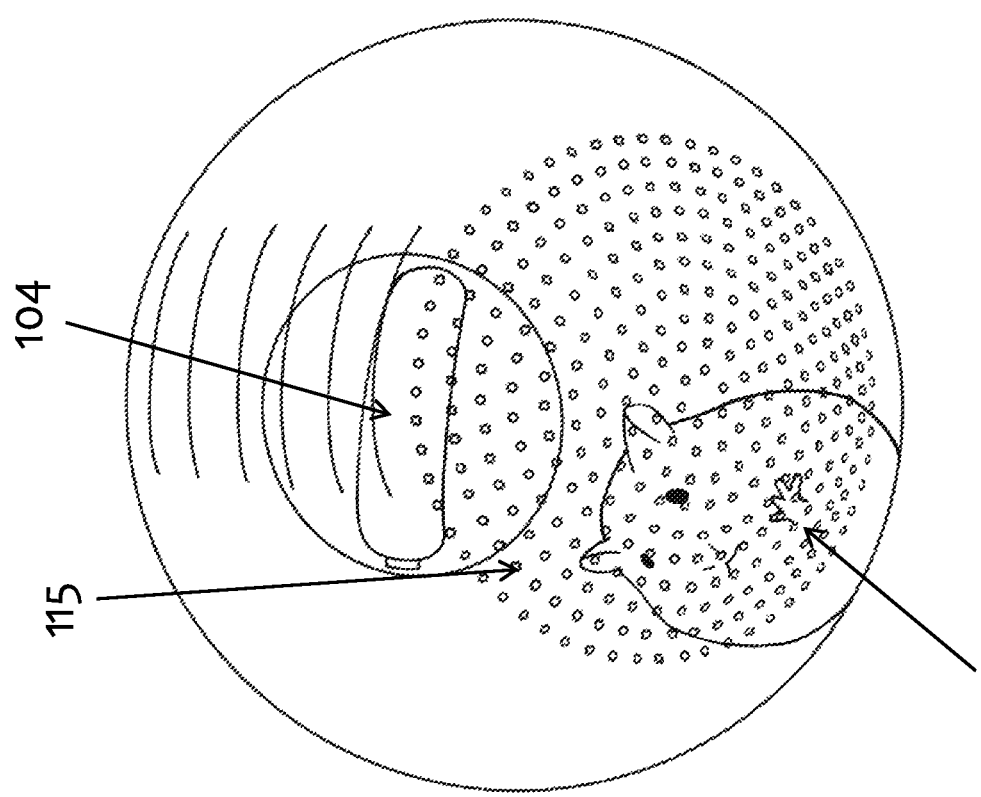
FIG. 7: Illustrates the traditional hamster ball utilizing aperture elongated slats for the purpose of ventilation.

FIG. 7 illustrates the traditional elongated slats 116 of the current common method of manufacture whereby the pet rodent is susceptible to injury of the appendages 118.

Figure 8:
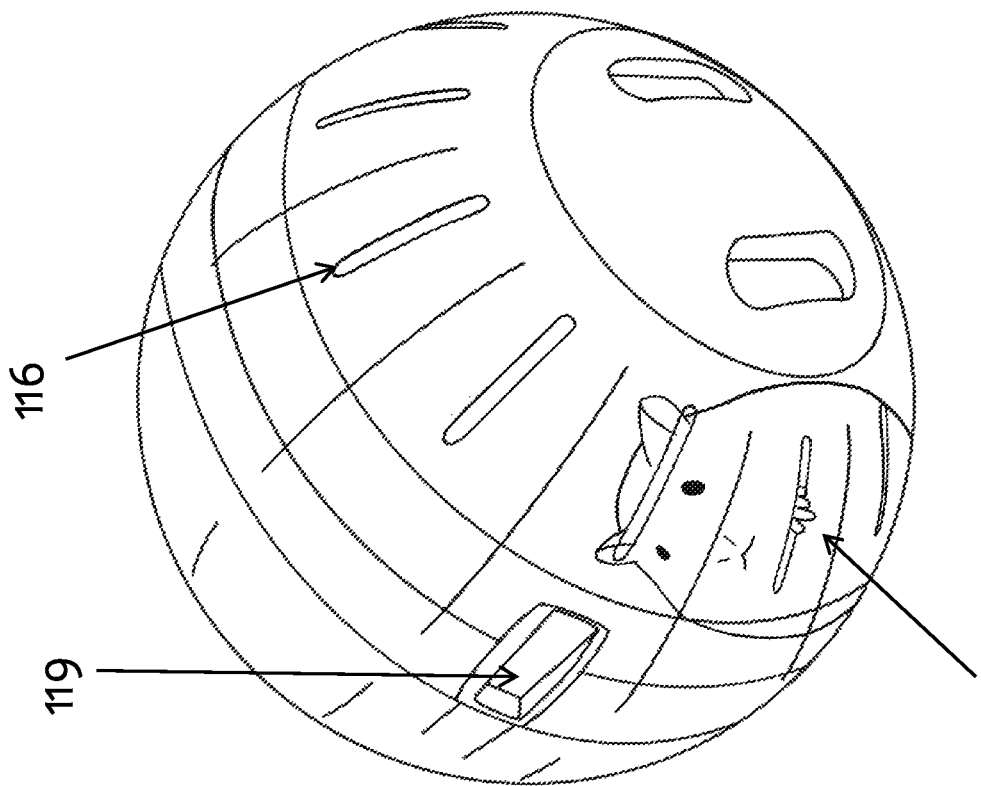
FIG. 8: Illustrates the hamster ball utilizing apertures as disclosed in the present invention.

FIG. 8 illustrates the method of apertures 115 disclosed herein whereby the pet rodent is protected from injury 117 due to the method of manufacture of the apertures.

FIG. 9 illustrates a close-up view of how the elongated slats can cause injury to pet rodent appendages.

FIG. 10 illustrates a close-up view of how the apertures in the current disclosure prevent injury to the appendages of the pet rodent.

What is claimed is:

1. A rodent exercise apparatus, comprising:
   a spherical shell defining a spherical cavity configured to support a rodent therein, the spherical shell having a first hemisphere and a second hemisphere, the first hemisphere having a first annular engagement end and the second hemisphere having a second annular engagement end;
   a coupling mechanism secured to first and second hemispheres to selectively connect the first and second annular engagement ends together and to form the spherical cavity, the coupling mechanism having a first coupling assembly and a second coupling assembly that is diametrically opposed to the first coupling assembly, each of the first and second coupling assemblies having a first coupler supported on the first hemisphere and a second coupler supported on the second hemisphere, the first coupler of the first coupling assembly selectively engageable with the second coupler of the first coupling assembly, the first coupler of the second coupling assembly selectively engageable with the second coupler of the second coupling assembly;
   a central axis extending through the first and second coupling assemblies;
   a first row of annular ventilation apertures defined through the first hemisphere and curved around the first coupler and the central axis, the first row defining a semi-circle of annular ventilation apertures around the first hemisphere that are uniformly spaced apart relative to one another; and
   a second row of annular ventilation apertures defined through the first hemisphere and curved around the first coupler and the central axis, the second row radially offset from the first row.

2. The rodent exercise apparatus of claim 1, wherein each annular ventilation aperture of the first row is separated from the central axis by a first radius, and wherein each annular ventilation aperture of the second row is separated from the central axis by a second radius that is different from the first radius.

3. The rodent exercise apparatus of claim 1, further comprising a first row of annular ventilation apertures curved around the second coupler, wherein when the first and second hemispheres are connected, the first row of annular ventilation apertures curved around the first coupler and the first row of annular ventilation apertures curved around the second coupler form a plurality of circles around the first and second couplers, the circles being concentric.

4. The rodent exercise apparatus of claim 3, further comprising a second row of annular ventilation apertures curved around the second coupler and radially offset from the first row of annular ventilation apertures curved around the second coupler.

5. The rodent exercise apparatus of claim 4, wherein the second row of annular ventilation apertures curved around the second coupler are disposed in mirrored relationship with the second row of annular ventilation apertures curved around the first coupler when the first and second hemispheres are connected together.

6. The rodent exercise apparatus of claim 1, wherein each annular ventilation aperture is beveled.

7. The rodent exercise apparatus of claim 1, wherein the spherical shell has a diameter that is 13 inches or less.

8. The rodent exercise apparatus of claim 1, wherein the first hemisphere includes a closed end opposite to the first annular engagement end, the closed end supporting a door.

9. The rodent exercise apparatus of claim 8, wherein the door is rotatable relative to the first hemisphere to selectively remove the door from the first hemisphere to access the spherical cavity, the door including a door locking feature depending therefrom, the door locking feature selectively engageable with a shell locking feature supported on the spherical shell when the door is coupled to the first hemisphere and rotated to a position in which the door locking feature aligns with the shell locking feature.

10. The rodent exercise apparatus of claim 9, wherein the door defines a finger cavity and includes a handle that extends over the finger cavity to enable a user to wrap their fingers underneath the handle.

11. The rodent exercise apparatus of claim 10, wherein the handle supports a safety latch mechanism, the safety latch mechanism including an actuator and an engagement member that is operably coupled to the actuator and selectively movable relative to the spherical shell to prevent the door from rotating relative to the spherical shell in response to actuation of the actuator.

12. The rodent exercise apparatus of claim 11, wherein the actuator is a switch that moves relative to the handle, and the engagement member includes a tab configured to selectively contact a stop of the spherical shell.

13. The rodent exercise apparatus of claim 1, wherein each annular ventilation aperture is 4 mm or less in diameter.

14. The rodent exercise apparatus of claim 1, wherein the first coupler depends from the first annular engagement end toward the second coupler, and wherein the second coupler depends from the second annular engagement end toward the first coupler.

15. The rodent exercise apparatus of claim 14, wherein the first coupler is a male coupler and the second coupler is a female coupler that receives the male coupler.

16. The rodent exercise apparatus of claim 3, wherein the second hemisphere has a closed end opposite to the second annular engagement end, the closed end defining a first annular row of annular ventilation apertures and a second annular row of annular ventilation apertures, the first and second annular rows of ventilation apertures defining a first plurality of concentric circles about the closed end of the second annular engagement end.

17. The rodent exercise apparatus of claim 16, wherein the plurality of circles around the first and second couplers includes a first plurality of concentric circles around the first coupling assembly and a second plurality of concentric circles around the second coupling assembly.

18. A rodent exercise apparatus, comprising:
a spherical shell defining a spherical cavity configured to support a rodent therein, the spherical shell defining a central axis and having a first hemisphere and a second hemisphere that are selectively coupled together, the spherical shell including three discrete sections of annular rows of annular ventilation apertures, the three discrete sections including a first section encircling the central axis on a first side of the spherical shell, a second section encircling the central axis on a second side of the spherical shell opposite to the first section, and a third section that encircles an axis that is orthogonal to the central axis, and wherein at least one of the first and second sections includes a first annular row of annular ventilation apertures around the central axis, wherein at least one annular ventilation aperture of the first annular row of annular ventilation apertures is defined through the first hemisphere and at least one annular ventilation aperture of the first annular row of annular ventilation apertures is defined through the second hemisphere.

19. The rodent exercise apparatus of claim 18, wherein at least one of the first and second sections includes a second annular row of annular ventilation apertures extending around the central axis, wherein at least one annular ventilation aperture of second annular row of annular ventilation apertures is defined through the first hemisphere and at least one annular ventilation aperture of the second annular row of annular ventilation apertures is defined through the second hemisphere.

20. The rodent exercise apparatus of claim 19, wherein the second annular row of annular ventilation apertures and the first annular row of annular ventilation apertures are concentric annular rows that are radially offset relative to one another.

21. A rodent exercise apparatus, comprising:
a spherical shell defining a spherical cavity configured to support a rodent therein, the spherical shell having a first hemisphere and a second hemisphere, the first and second hemispheres defining a ball housing, a first axis, and a second axis that is transverse to the first axis, the ball housing including three sections of annular rows of annular ventilation apertures, each of the three sections being separate and distinct from the other sections, the three separate and distinct sections including a first section encircling the first axis on a first side of the ball housing, a second section encircling the first axis on a second side of the ball housing opposite to the first section, and a third section that encircles the second axis;
a door removably coupled to the first hemisphere and having a handle, the door configured to rotate about the second axis to remove the door from the ball housing, the second axis of the ball housing extending through the door when the door is coupled to the ball housing;
a door locking feature depending from the door;
a shell locking feature extending from first hemisphere into the spherical cavity, the shell locking feature selectively engageable with the door locking feature when the door locking feature is received within the spherical cavity and the door is rotated relative to the ball housing to a predetermined position in which the door locking feature engages the shell locking feature to secure the door to the ball housing in a locked position; and
a safety latch mechanism coupled to the handle and selectively movable relative to the handle to prevent the door from rotating relative to the ball housing when the door locking feature and the shell locking feature are disposed in the locked position.

\* \* \* \* \*